United States Patent
Hull et al.

(10) Patent No.: US 10,062,054 B2
(45) Date of Patent: *Aug. 28, 2018

(54) COMPUTERIZED METHOD AND SYSTEM FOR ESTABLISHING A NETWORK CONNECTION BASED ON A CONTACT LIST AUTOMATICALLY SEEDED FROM NETWORK BEHAVIORAL ANALYSIS OF A USER

(75) Inventors: Mark E. Hull, San Jose, CA (US); F. Randall Farmer, Palo Alto, CA (US); Ellen S. Perelman, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/022,399

(22) Filed: Feb. 7, 2011

(65) Prior Publication Data
US 2011/0125661 A1     May 26, 2011

Related U.S. Application Data

(63) Continuation of application No. 10/863,926, filed on Jun. 8, 2004, now Pat. No. 7,885,901.
(Continued)

(51) Int. Cl.
*G06Q 10/00* (2012.01)
*G06Q 10/10* (2012.01)
*G06Q 30/02* (2012.01)
*G06Q 30/06* (2012.01)
*G06Q 50/00* (2012.01)
*H04L 12/58* (2006.01)
*H04L 29/08* (2006.01)

(52) U.S. Cl.
CPC .......... *G06Q 10/107* (2013.01); *G06Q 30/02* (2013.01); *G06Q 30/0601* (2013.01); *G06Q 50/01* (2013.01); *H04L 51/32* (2013.01); *H04L 67/306* (2013.01)

(58) Field of Classification Search
USPC ............................................. 705/1, 319, 1.1
See application file for complete search history.

(56) References Cited

U.S. PATENT DOCUMENTS

| 6,247,043 B1 * | 6/2001 | Bates ................ G06F 17/30699 707/E17.059 |
| 2003/0050977 A1 * | 3/2003 | Puthenkulam et al. ...... 709/204 |

(Continued)

*Primary Examiner* — Gabrielle A McCormick
(74) *Attorney, Agent, or Firm* — James J. DeCarlo; Greenberg Traurig, LLP

(57) ABSTRACT

A method, apparatus, and system are directed towards seeding a user's contacts for their online social network. The invention is arranged to automatically recommend to the user a set of seed contacts that the user may employ to invite to join their social network. The set of seed contacts may be harvested from the user's existing portal activities, as well as other sources. In one embodiment, the invention analyzes portal activity, such as email exchanges with the user, and the like, to determine a frequency of contact with the user. Other sources may include but not be limited to emails, names within an address book of the user, names within an address book of another person, a buddy list, an instant messaging list, an activity, a mailing list, an online discussion group, a membership in a category, chat group, and the like.

13 Claims, 4 Drawing Sheets

Related U.S. Application Data

(60) Provisional application No. 60/544,639, filed on Feb. 13, 2004, provisional application No. 60/540,505, filed on Jan. 29, 2004.

(56) References Cited

U.S. PATENT DOCUMENTS

| | | | |
|---|---|---|---|
| 2004/0122855 A1* | 6/2004 | Ruvolo et al. | 707/104.1 |
| 2004/0210479 A1* | 10/2004 | Perkowski et al. | 705/14 |
| 2005/0120084 A1* | 6/2005 | Hu et al. | 709/206 |

* cited by examiner

COMPUTERIZED METHOD AND SYSTEM FOR ESTABLISHING A NETWORK CONNECTION BASED ON A CONTACT LIST AUTOMATICALLY SEEDED FROM NETWORK BEHAVIORAL ANALYSIS OF A USER

CROSS REFERENCE TO RELATED APPLICATIONS

This application is a continuation of, and claims priority from co-pending U.S. patent application Ser. No. 10/863,926, filed Jun. 8, 2004, entitled, "Method and System for Seeding Online Social Network Contacts", which claims the benefit of U.S. Provisional Application, titled "System and Method for Social Networking," Ser. No. 60/544,639 filed on Feb. 13, 2004, and U.S. Provisional Application, titled "System and Method for Social Networking," Ser. No. 60/540,505 filed on Jan. 29, 2004, the benefit of the earlier filing date of which is hereby claimed under 35 U.S.C. § 119(e) and further incorporated by reference.

FIELD OF THE INVENTION

The present invention relates generally to computing software, and more particularly, but not exclusively to a method and system for seeding contacts for a user's online social network.

BACKGROUND OF THE INVENTION

Social networking is a concept that an individual's personal network of friends, family colleagues, coworkers, and the subsequent connections within those networks, can be utilized to find more relevant connections for dating, job networking, service referrals, activity partners, and the like.

A social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first-degree relationships. First-degree relationships can have varying degrees of closeness, trust, and other characteristics. These relationships can also be unidirectional or bidirectional. A unidirectional relationship typically means that a first person is willing and able to interact with a second person, but the second person may not be willing or able to interact with the first person. Conversely, a bidirectional relationship typically means that both people are willing and able to interact with each other.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second-degree relationship.

The above personal relationships, and others, can be utilized to find and develop relevant connections for a variety of objectives. Finding and developing relevant connections can be accelerated with online services. Such online social networking can be used to mine personal and/or interest relationships in a way that is often more difficult and/or time-consuming to do offline. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
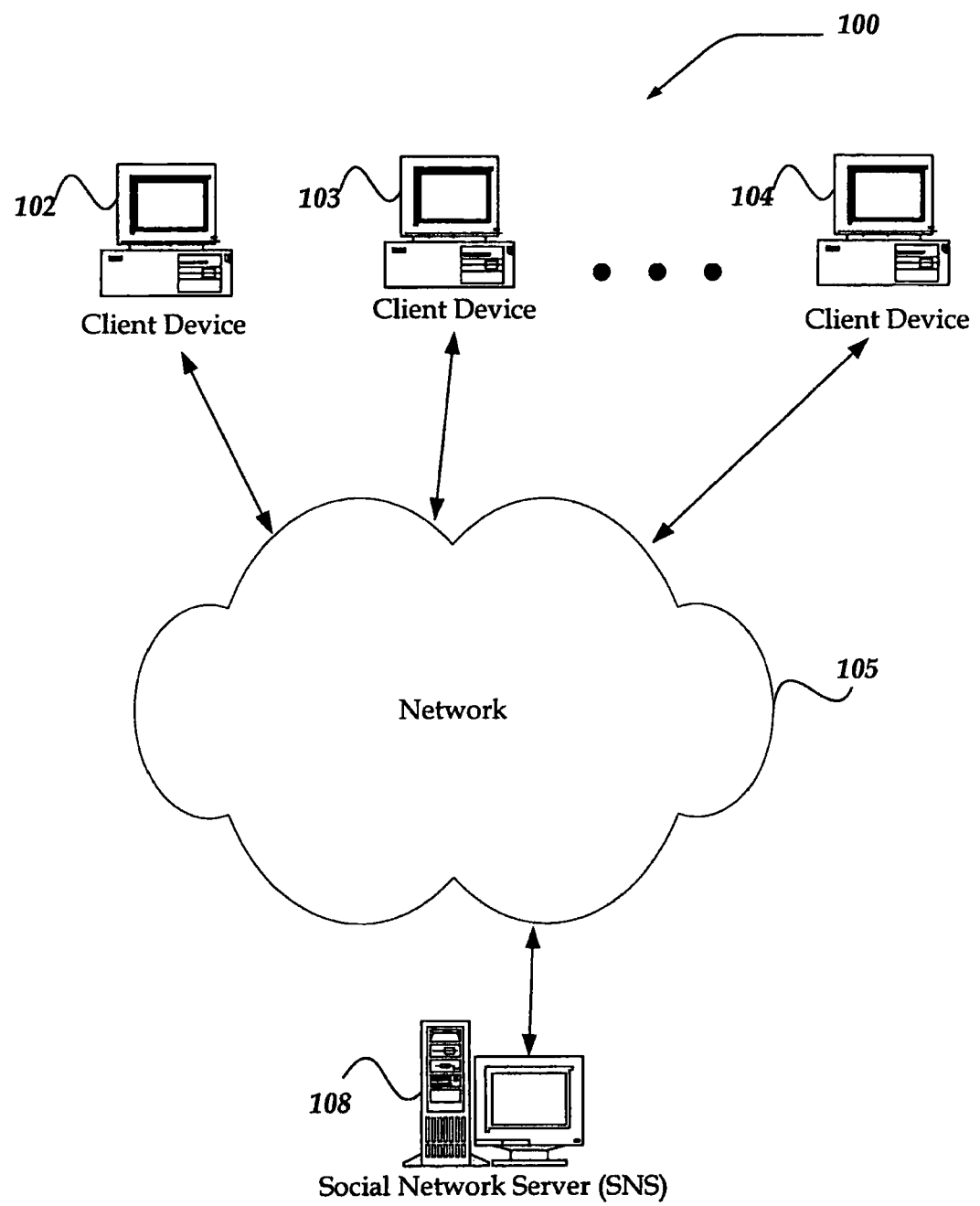
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards providing a system, apparatus, and method of seeding contacts for a user's online social network. The invention provides a user with an easy way to build and mine personal networks. As such, in one embodiment, the invention automatically recommends to the user, perhaps new to social networking, a set of seed contacts that the user may wish to invite to join their social network. The set of seed contacts that are recommended may be harvested from the user's existing portal activities. In one embodiment, this may include analyzing portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, a mailing list, an online discussion group, an activity, chat group, and the like. By automatically recommending seed contacts to the user's online social network, the user is freed from having to create their own contacts from scratch.

Accordingly, as employed herein, the term "user" can include an online portal subscriber and/or an online social network user. The term social network can include a group of people with which a user has direct and/or indirect relationships, as well as a service for communicating information to and/or from any of the people with which a user has direct and/or indirect relationships.

An indirect relationship can also be through a shared interest, without any degree of personal relationship between intermediate contacts. For example, a set of complete strangers can comprise a social network based on a common interest in a topic or an activity, such as fishing. At first, each person may only have a relationship with the activity of fishing, without any relationship through other people in the set. However, the activity of fishing can act as a node that binds the set of people into a social network, just as if the node were a mutual friend of each person in the set. The members of the set can build people relationships by somehow expressing to each other the common interest in the activity. Once a person is aware of another person with the same interest, the people can choose to interact. Thus, the term social network includes a group of people associated by a common interest and/or a service for communicating information to and/or from any of the people with which a user has an interest relationship.

To build a trust base quickly, information about another member gathered from other venues can be provided to a new member of the online social network. For example, information about another member's behavior in an online portal can be made accessible to the new member of the online social network. Information about the new members's behavior may also be employed to seed their own contact list. In addition to behavior information, such portal information can comprise user-defined information, portal assessment information, and the like. User-defined information can include contact lists, preferences, survey responses, and other information provided by the user. User behavior information can include frequency of visiting Web sites, types of online purchases, types of online communication used most often, duration of participating in online activities, and other information that can be detected about a user's online actions. Portal assessment information can include compliments about a user, complaints about a user, reputation assessments from peer users, comparison between user-defined information and user behavior information, spam detection about a user, and other information determined by others about a user. Many other types of information can be stored and/or determined by an online portal regarding a user. The present invention enables a member of an online social network to access and/or share portal information, thereby enabling the member to learn more about each other, to quickly identify compatible members, to create a basis for rapid seeding and viral-style growth of their social network, thus, freeing the member from having to create a contact list from scratch, and generally to enhance experiences relating to the online social network.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, and a social network server (SNS) 108. Network 105 is in communication with and enables communication between each of client devices 102-104, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie-talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to access and/or manage a portal profile, an SNS profile, SNS category information, SNS activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to establish a user's online portal, to customize the user's interaction with an online portal, to manage the user's online portal, to customize how another social network user might view a persona, profile, or the like. For example, the user may employ the client application, in part, to establish and/or modify an online portal profile, to manage a contact list, to interact with online portal services, such as financial information tools, to make online purchase, to store and communicate with contacts, and the like. The user may also employ the client application, in part, to establish and/or modify a portal profile and/or an SNS profile, to establish categories of SNS relationships to provide one customized view of SNS profile information for family members, another customized view for poker members, yet another view for fishing buddies, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. In essence, network 105 includes any communication method by which information may travel between client devices 102-104 and SNS 108.

The media used to transmit information in communication links as described above illustrates one type of computer-readable media, namely wired and/or wireless communication media. Generally, computer-readable media includes any media that can be accessed by a computing device. Computer-readable media may include computer storage media, communication media, or any combination thereof. Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SNS 108 is described in more detail below in conjunction with FIG. 2. Briefly, however, SNS 108 may include any computing device capable of connecting to network 105 to communicate information between client devices 102-104. Devices that may operate as SNS 108 include personal computers desktop computers, multi-processor systems, microprocessor-based or programmable consumer electronics, network PCs, servers, and the like. SNS 108 and client devices 102-104 can be arranged in a client-server relationship relative to each other. Client devices 102-104 can also be combined with SNS 108 in virtually any other computing architecture, including, but not limited to a peer-to-peer architecture, and the like, without departing from the scope of the present invention.

SNS 108 may be configured to send and/or make accessible, portal information associated with a user, and configured to enable the user to customize at least a portion of the portal information. SNS 108 also may be configured to use the portal information and user input information as online social network information, and to enable the user to customize at least a portion of the social network information. SNS 108 may further be configured to employ the social network information, as well as other information, to automatically seed a contact list for a member. Such social network information may include, but is not limited to, user profile information, contact information, relationship category information, an activity, user-defined information, membership information associated with a relationship category, and the like.

SNS 108 may further employ the social network information to enable the user to customize a view associated with a social network relationship. By providing customized views, the user may put forth different online profiles, public personas, and the like, by sharing varying quantities of personal information with another social network user. Criteria employed to enable customization of the views may include, but is not limited to, degrees of separation, category of relationship (such as family, friend, colleague, and the like), as well as any assessment of closeness, trust, and the like, based on information about the relationship between the user and the prospective viewer, and the like. SNS 108 may also enable another social network user to view the customized view based on the received criteria. SNS 108 may employ a web service, email service, and the like, to make the customized view available to the other social network user, such as a user of one of client devices 102-104.

Illustrative Server Environment

Figure 2:
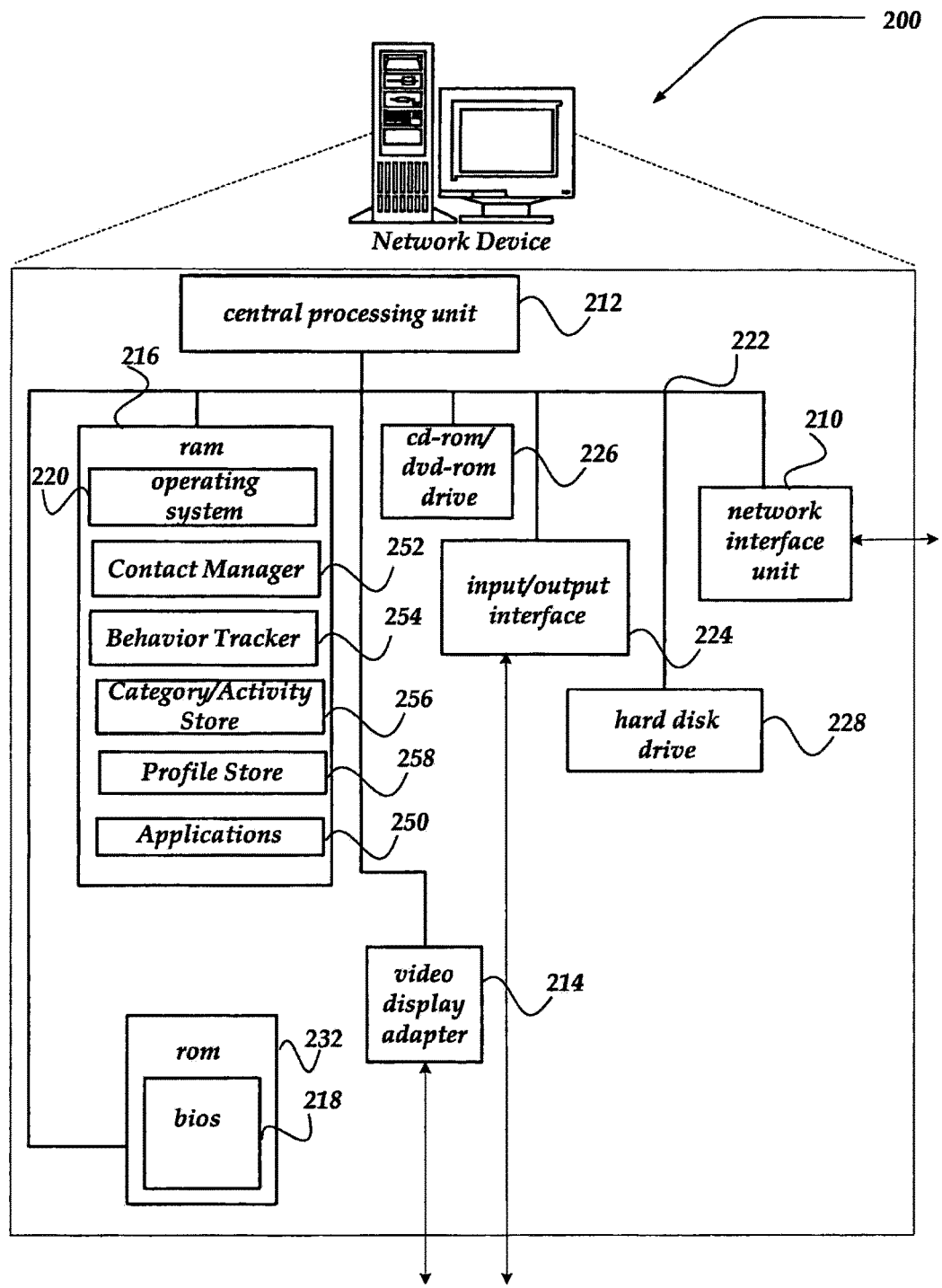
FIG. 2 shows one embodiment of a network device that may be included in a system implementing the invention.

FIG. 2 shows a functional block diagram of an exemplary network device 200, according to one embodiment of the invention. For example, network device 200 can comprise SNS 108. Client devices 102-104 can be similarly configured. Network device 200 may include many more components than those shown. The components shown, however, are sufficient to disclose an illustrative embodiment for practicing the invention.

Network device 200 includes a processing unit 212, a video display adapter 214, and a mass memory, all in communication with each other via a bus 222. The mass memory generally includes RAM 216, ROM 232, and one or more permanent mass storage devices, such as an optical drive 226, a hard disk drive 228, a tape drive, and/or a floppy disk drive. The mass memory stores an operating system 220 for controlling the operation of network device 200. Any general-purpose operating system may be employed. A basic input/output system ("BIOS") 218 is also provided for controlling low-level operation of network device 200. As illustrated in FIG. 2, network device 200 can communicate with the Internet, or some other communications network, such as network 105 of FIG. 1, via a network interface unit 210, which may be constructed for use with any of variety of communication protocols including, but not limited to, transmission control protocol/Internet protocol (TCP/IP), and the like. Network interface unit 210 is sometimes known as a transceiver, transceiving device, network interface card (NIC), and the like. Network device 200 also includes input/output interface 224 for communicating with external devices, such as a mouse, keyboard, scanner, or other input devices not shown in FIG. 2.

Network device 200 may include a simple mail transfer protocol (SMTP) handler application for transmitting and receiving email. Network device 200 may also include a hypertext transfer protocol (HTTP) handler application for receiving and handing HTTP requests, and an HTTP secure sockets (HTTPS) handler application for handling secure connections. The HTTPS handler application may initiate communication with an external application in a secure fashion.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as a contact manager 252, behavior tracker 254, category/activity store 256, and profile store 258.

Category/activity store 256 may include a database, text, folder, file, and the like, that is configured to maintain and store information that identifies a relationship category, an activity, and the like. While category/activity store 256 may store identification information, profile store 258, described below, may store profile and criteria information for each portal subscriber and/or social network user. Profile store 258 can comprise multiple distributed data stores, such as a portal subscriber profile data store, a social network profile data store, and the like.

A category may represent a classification of users and/or corresponding relationships within a user's social network, such as family members, friends, co-workers, poker buddies, fishing buddies, and the like. Social network users can establish their own categories and profile information based on corresponding portal profile data and/or manually entered data. Information relating to a category may be accessible to those identified as members of the category by the creating social network user. However, the invention is not so limited, and global categories may be established that provide profile information about a social network user to virtually any other social network user. Each category may include a set of user-definable social network user information. When the category is user-definable, the set of social network user information (profile information) may also be user-definable. For example, the user may determine that social network user information associated with hobbies may be included in a category for sports, while it may be excluded from a category associated with religion, and the like.

An activity may include virtually any way, manner, and the like, in which a social network user may select to employ their social network connections. For example, activities may include, but are not limited to, dating, job seeking, reconnecting with military comrades, communicating with fellow alumni, seeking help & advice, and the like. It may be desired, although not required, that an activity be globally configured and managed by an online social network service, and made available to all users of the online social network service. Additionally, at least a minimum set of profile information associated with the activity may be globally established. For example, if the activity includes dating, the minimum set of profile information, may include, but is not limited to age, sexual preference, information associated with one's physical appearance, and the like. If the activity includes job search, employment search, and the like, the minimum set of profile information may include, but is not limited to, job history, salary desired, job qualifications, experience, and the like. However, an activity may further include an optional set of profile information, such as achievements, hobbies, recommendations, and the like. Such profile information can be provided from the portal to the online social network service or otherwise accessed by the online social network service.

Profile store 258 may include a database, text, folder, file, and the like, that is configured to maintain and store information associated with a portal subscriber and/or a corresponding social network user. For example, a portal subscriber's portal profile may include, but is not limited to such information as name, alias, nickname, age, email address, address book, online behaviors, and the like. In one embodiment, a collection of such information may be provided to an online social network service to comprise a basic social network profile for the social network user. Additional information may also be included in profile store 258 that includes category profile information, activity profile information and the like. Such additional information may include, but is not limited to, a photograph, a hobby, a job history, a school history, career information, dating information, military information, sports information, religious information, sexual orientation, politics, interests, favorite sites, self description, frequency of accessing a Web site, duration of participating in an online activity, number of purchases made from an online vendor, and the like. In one embodiment, at least some information includes a Universal Resource Locator (URL). Virtually any information associated with the portal subscriber and associated social network user may be included within profile store 258.

Moreover, profile store 258 may store and maintain criteria associated with how profile information may be viewed by another social network user. For example, profile store 258 may include criteria indicating that only a member of a particular category may view a particular photograph, a subset of profile information, and the like. While information may be selected at a field by field level of granularity, the present invention however, is not so limited. For example, the present invention enables the social network user to establish criteria that is based on a relationship between the prospective viewer and the user. The relationship criteria may then be employed to map various collections, groupings, sets, and the like, of portal profile information, to a corresponding social network profile. As such, the social network user, for example, may establish criteria such that any other social network user that is within some predetermined degrees of separation may view a predetermined set of social network profile information that is mapped from corresponding portal profile information.

Behavior tracker 254 is configured to detect and store information regarding a portal subscriber's online actions and can determine profile characteristics about the portal subscriber. For example, behavior tracker 254 can detect that a portal subscriber navigated to one or more news Web sites at approximately the same time each day for a current month, spent approximately twenty hours playing an online game during each week of the current month, made purchases from multiple overseas vendors of software, participated in a hacker chat room, performed searches for movie times, sent an email messages to a thousand sequential addresses in one day, and/or performed other actions. From these actions, behavior tracker 254 can determine characteristics about the portal subscriber, assess the accuracy of information provided by the portal subscriber to the online portal, gather feedback about the portal subscriber submitted by other portal subscribers, and perform other tracking and evaluation operations. For instance, behavior tracker 254 can give a low weighting to portal profile information submitted by the portal subscriber, which indicated that the portal subscriber was a practicing dentist. Behavior tracker 254 might also includes a flag, indicator, and the like, indicating that the portal subscriber might be engaged in spamming. Moreover, another flag might be included that indicates that another member of the online network that may have interacted with portal subscriber was practicing potentially undesirable activity. Other aspects of behavior tracker 254 are described in more detail below in conjunction with FIG. 3.

Contact manager 252 may be configured to employ information from a variety of sources, including behavior tracker 252, profile store 258, and the like, to enable a user to manage their social networking contacts. For example, in one embodiment, when the user joins a social network, contact manager 252 may automatically recommend contacts for which the user may wish to invite to join their social network, their categories, and the like. The recommended set of seed contacts may also be harvested from the user's existing portal activities. In one embodiment, contact manager 252 may analyze portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, an activity, chat group, and the like. In another embodiment, a master list of contact information may also be employed as a source for seed contacts. Such master list of contact information, for example, may include a variety of sources for contacts, including, but not limited to, an address book repository, multiple source social network data stores, and the like. Contact manager 252 may then provide the set of seed contacts to the user for review, acceptance, modification, and the like. Contact manager 252, for example, may employ a process substantially similar to process 400 described below in conjunction with FIG. 4.

Although illustrated in FIG. 2 as distinct components in network device 200, contact manager 252, behavior tracker 254, category/activity store 256, and profile store 258 may be arranged, combined, and the like, in any of a variety of ways, without departing from the scope of the present invention. For example, category/activity store 256 may be arranged as separate components, such as an activity store and a category store, or the like. Moreover, contact manager 252, behavior tracker 254, category/activity store 256, and profile store 258 may reside in one or more separate computing devices, substantially similar to network device 200.

Portal Process

Figure 3:
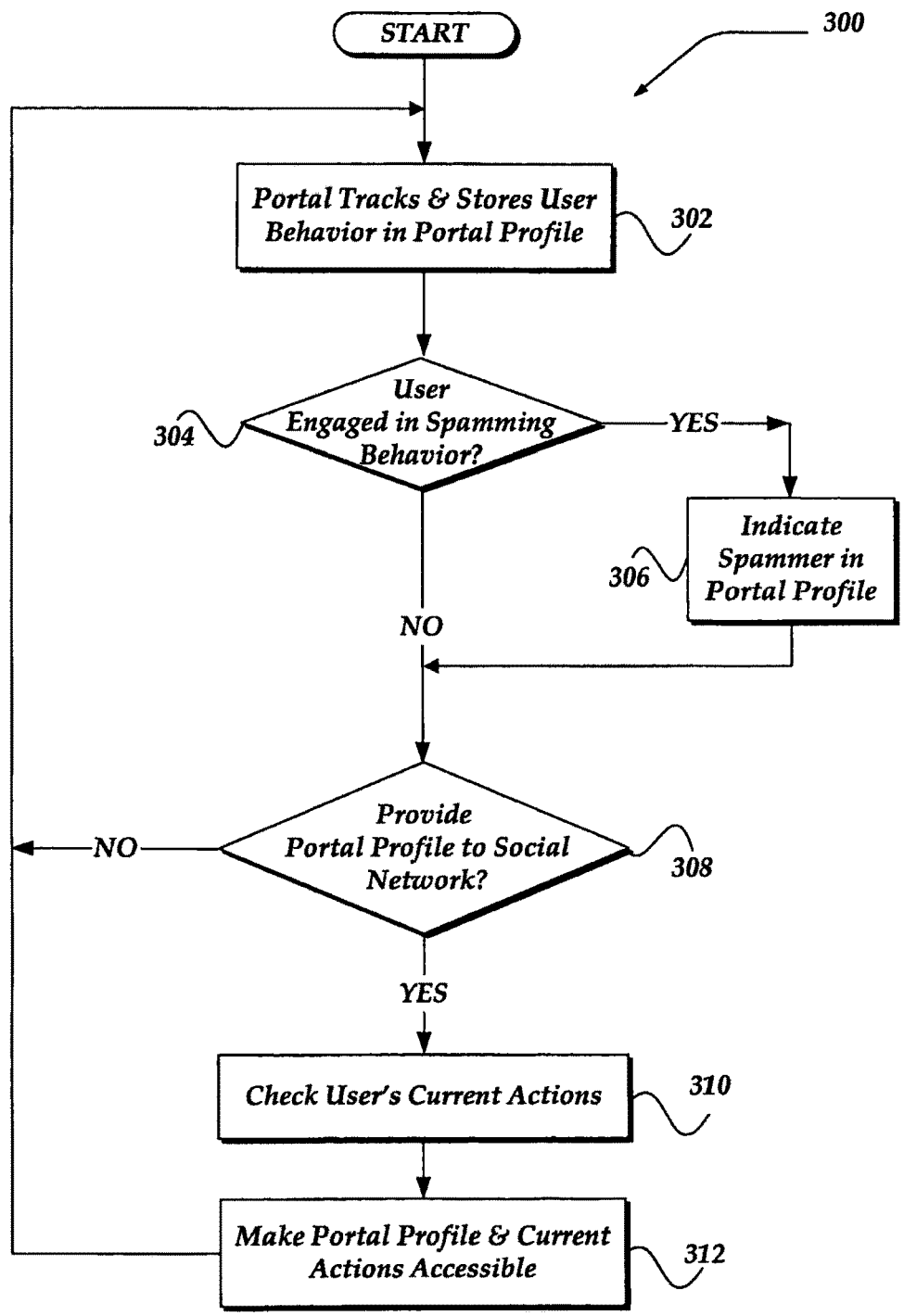
FIG. 3 illustrates a logical flow diagram generally showing one embodiment of a process for making portal information available.

The operation of certain aspects of the present invention will now be described with respect to FIGS. 3-4. Briefly, FIG. 3 illustrates a logical flow diagram generally showing one embodiment of a process for an online portal to make portal subscriber information available for use in seeding a contact list. Process 300 of FIG. 3 may be implemented, for example, within SNS 108 of FIG. 1.

The process is typically entered, after a start block, when a portal subscriber registers with an online portal. Initially, a portal subscriber's portal profile may only include a user ID. However, the portal subscriber can enter other information such a name, age, preferences, interests, contact list, and the like. The entered information may be stored in the portal profile and is usually accessible to the portal subscriber. Typically, with the portal subscriber's consent, the online portal tracks and stores the portal subscriber's behavior in the portal profile, at block 302. Some, or all, of the tracked information can be accessible to, or hidden from, the portal subscriber. In addition, the portal can add information to the portal profile indicating characteristics, possible interests, and/or other information determined about the portal subscriber. For example, the portal can determine that the portal subscriber uses the portal mostly to read news, mostly to find a job, mostly to write blogs, and/or other usage habits. Additionally, if the subscriber selects to join an activity, a group, online club, and the like, such information may also be collected and stored in the portal profile. If the subscriber receives, sends messages to another subscriber, such information may also be tracked. In fact, virtually any activity, behavior, and the like, may be tracked and stored in the subscriber's portal profile.

Moving to decision block 304, the portal can use some of the above information to determine whether the portal subscriber has engaged in spamming behavior, and/or other behavior that is deemed undesirable by portal operators, by other portal subscribers, by law, and the like. If it is determined that the portal subscriber has engaged in undesirable behavior, such as spamming, the portal can indicate this fact in the portal subscriber's portal profile, at block 306. Other actions may also be taken, as desired, including, but not limited to, warning the portal subscriber, sanctioning the portal subscriber, terminating the portal subscriber's access to the portal, and the like.

Additionally, in one embodiment, if the portal subscriber is in communication with another member that may have engaged in undesirable behavior, this fact may also be included within the information within the portal subscriber's portal profile, the other member's portal profile, and the like, at block 306.

Whether or not the portal subscriber has engaged in undesirable behavior, the process moves to decision block 308, where a determination is made whether the information already obtained through the portal is be provided to the social network. If the portal information is not being provided, portal process 300 returns to block 302 to continue tracking the portal subscriber's behavior. Otherwise, the portal process proceeds to block 310, where a check of the portal subscriber's current actions is performed. Current actions can include listening to music streamed to the portal subscriber's computer, viewing a particular Web site, and the like. Moving to block 312, the current actions and the portal profile can then be made accessible to the social network, for use in a variety of activities, including, but not limited to seeding a contact list for the portal subscriber, another portal subscriber, and the like. Portal processing may then return to block 302 to continue tracking the portal subscriber's behavior.

Seeding Online Social Network Contacts

Figure 4:
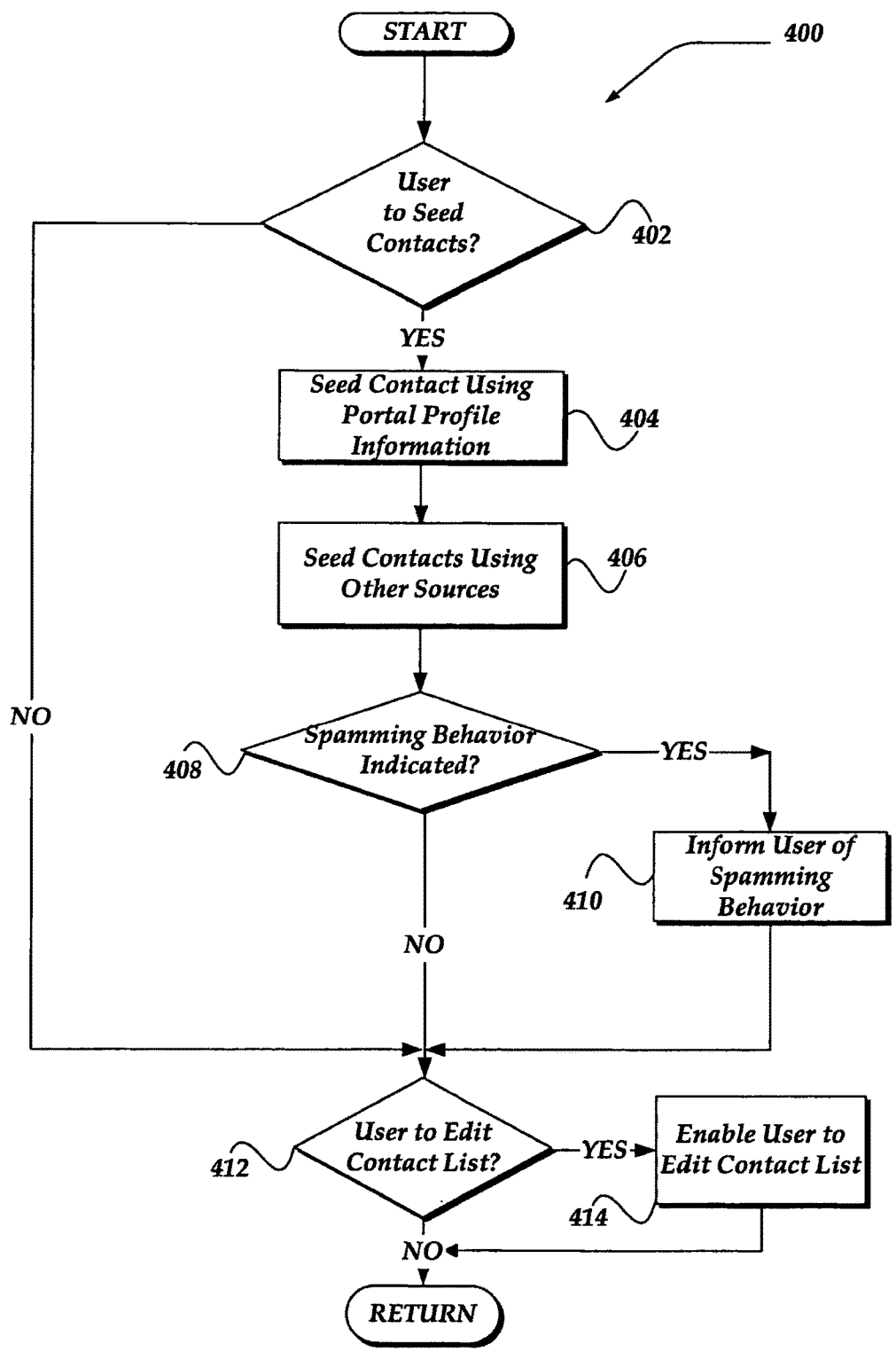
FIG. 4 illustrates a logical flow diagram generally showing one embodiment of a process for seeding an online social network contact list based, in part, on portal information, in accordance with the present invention.

FIG. 4 illustrates a logical flow diagram generally showing one embodiment of a process for seeding an online social network contact list based, in part, on portal information. Process 400 shown in FIG. 4 may be implemented, for example, within SNS 108 of FIG. 1.

Process 400 is typically entered, after a start block, at decision block 402, where a determination is made whether the user has requested seeding of their online social network contact list. In one embodiment, the user need not make the request, as the invention may be configured to determine whether the user's contact list is to be seeded. Such automatic seeding may arise, for example, when the user has recently registered as a portal subscriber and has not yet populated their contact list. Automatic seeding may also arise when it is determined that the contact list is empty, out of date, and the like. In any event, if it is determined that the user's contact list is not to be seeded, processing would then branch to decision block 412.

However, if it is determined, at decision block 402, that the user's contact list is to be seeded, processing continues to block 404. At block 404, the user's online social network contact list is seeded using portal profile information. In one embodiment, the portal profile information employed to seed the user's contact list includes the user's own portal profile information, such as that which may have been tracked and stored during process 300 of FIG. 3. Such seeding of the user's contact list may be complete or partial. That is, it may be determined that some portal profile information does not provide sufficient information about another social user to warrant importation. In another embodiment, portal profile information associated with another user within the current user's portal profile information may be used to seed the present user's contact list. This may arise, for example, where a degree of separation between the other user and the current user is within a predetermined number of degrees. It may also arise, where the current user has predefined a rule, condition, relationship, activity, and the like that may be employed to select a candidate contact for importation.

Upon completion of block 404, processing continues to block 406, where other sources for contacts are employed to seed the user's contact list. Virtually any other source may be employed to seed the user's contact list, including, but not limited to, contacts within an address book of the user, contacts within an address book of another person within the portal, a contact within a buddy list, an instant messaging buddy list, a contact within an activity for which the current user is associated, a contact within a mailing list, an online discussion group, a chat group, and the like. In one embodiment, a master list of contacts is employed, at least in part, to seed the user's contact list. Other contacts may also be derived through the above mechanisms, based on a variety of criteria, including, but not limited, to a degree of separation between contacts within the above, and the like. In any event, upon seeding the current user's contact list with information from other sources, processing proceeds to decision block 408.

At decision operation 408, the online social network service can evaluate the information now in the social network profile to determine whether a contact within the seed contact list engaged in undesirable behavior, such as spamming. The seeded contact list can be analyzed by the online social network service and/or the social network profile can simply include a flag from the portal profile, indicating that the seeded contact engaged in undesirable behavior through the portal. Based on this evaluation, the online social network service and/or members of the social network can take precautionary actions.

For example, if it is determined that a seeded contact has engaged in undesirable behavior, such as spamming, and the like, processing branches to block 410, where, the online social network service, and the like, can inform the user of the seeded contact's previous portal misbehavior(s) and/or current misbehaviors. Processing then flows to decision block 412. If, however, seeded contacts have not engaged in undesired behavior, processing also continues to decision block 412.

At decision block 412, a determination is made whether the current user is to edit the contact list. The user may decide not to modify the contact list for any of a variety of reasons, in which case, processing returns to a calling process to perform other actions. However, if the user is to edit the contact list, processing continues to block 414.

At block 414, the user can add and/or modify information in the user's contact list. For example, the user may intend to retain much of the information imported from the portal profile, which may be based, in part, on an interaction with the online portal, but remove contact information derived from some of those interactions that the user does not wish to employ. For example, where a contact is identified to have engaged in undesirable behavior, the user may wish to delete the contact from their contact list. The user may also enter contacts that have not been identified through the various mechanisms described above. Upon completion of block 414, processing returns to the calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the operations indicated in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the indicated actions, combinations of steps for performing the indicated actions and program instruction means for performing the indicated actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method comprising:
receiving, by a social networking server, information related to a subscriber's intent to utilize a service associated with an online portal of a social network provided by the social networking server;
identifying, by the social networking server, a plurality of portal information associated with the online portal related to the subscriber, said plurality of portal information comprising a first portal information and second portal information, said first portal information comprising a portion of the plurality of portal information that is specific to the intended service of the online portal and is unmodifiable due to its relationship with the service, said second portal information comprising another portion that has features enabling its customization when establishing connections via the social network, said second portal information comprising electronic data indicating at least one behavior of the subscriber and portal assessment information, said at least one behavior indicating types of activities said subscriber has performed via said online portal and behavior information associated with each activity, said portal assessment information comprising data generated by other users of the online portal about said subscriber;

determining, by the social networking server, that the subscriber is a member of a computerized online social network;

automatically determining, by the social networking server, a portion of said second portal information that comprises electronic data related to the subscriber and corresponding to at least one other member of the computerized online social network, said portion determination comprising analyzing the portion of the second portal information related to the at least one behavior and the portal assessment information, and, based on said analysis, identifying said behavior information for each behavior and the portal assessment information generated by said other users;

automatically creating, by the social networking server, a new contact list on the online portal, the creation of the new contact list comprising electronically importing said determined portion of the second portal information into said new contact list, and electronically associating the new contact list with an account of the subscriber on the computerized online social network based on said determination that the subscriber is a member of the computerized social network; and establishing an electronic networked connection, via the social networking server over the online social network, with at least one other member of the computerized online social network that is identified in the new contact list, said established electronic networked connection enabling the subscriber to interact with said at least one other member via the online social network.

2. The method of claim 1, wherein the computerized online social network includes at least one of multiple degree relationships among members of the computerized online social network, and a shared interest among members of the computerized online social network.

3. The method of claim 1, wherein determining the second portal information comprises tracking at least one of a frequency with which the subscriber accessed at least one of a portal service and a non-portal Web site, a duration over which the subscriber accessed at least one of the portal service and the non-portal Web site, a content type accessed by the subscriber through at least one of the portal service and the non-portal Web site, an online purchase made by the subscriber through at least one of the portal service and the non-portal Web site, a participation in an online group, a use of a chat session, a use of instant messaging, and a use of an email service.

4. The method of claim 1, wherein the behavior of the subscriber comprises participating in at least one of an online friend matching service, an online dating service, an online job searching service, an online classmate searching service, an online military colleague searching service, an online club, an online financial service, an online auction, and an online purchase.

5. The method of claim 1, further comprising:
determining that the at least one other member has engaged in spamming; and
indicating in the second portal information that the at least one other member has engaged in spamming.

6. The method of claim 1, further comprising revising the second portal information based on a current online action of the subscriber, wherein the current online action includes at least one of playing a media file, receiving a streaming media, viewing a Web page, and participating in an instant message session.

7. The method of claim 1, further comprising revising the second portal information based, in part, on at least one of an email address, an address book of the subscriber, another address book of at least one other member within the portal, a buddy list, an instant messaging buddy list, an activity, a mailing list, an online discussion group, a chat group, a master contact list, and user-defined information.

8. A social networking server comprising:
a processor;
a non-transitory computer-readable storage medium for tangibly storing thereon program logic for execution by the processor, the program logic comprising:
logic executed by the processor for receiving information related to a subscriber's intent to utilize a service associated with an online portal of a social network provided by the social networking server;
logic executed by the processor for identifying a plurality of portal information associated with the online portal related to the subscriber, said plurality of portal information comprising a first portal information and second portal information, said first portal information comprising a portion of the plurality of portal information that is specific to the intended service of the online portal and is unmodifiable due to its relationship with the service, said second portal information comprising another portion that has features enabling its customization when establishing connections via the social network, said second portal information comprising electronic data indicating at least one behavior of the subscriber and portal assessment information, said at least one behavior indicating types of activities said subscriber has performed via said online portal and behavior information associated with each activity, said portal assessment information comprising data generated by other users of the online portal about said user;
logic executed by the processor for determining that the subscriber is a member of a computerized online social network;
logic executed by the processor for automatically determining a portion of said second portal information that comprises electronic data related to the subscriber and corresponding to at least one other member of the computerized online social network, said portion determination comprising analyzing the portion of the second portal information related to the at least one behavior and the portal assessment information, and, based on said analysis, identifying said behavior information for each behavior and the portal assessment information generated by said other users;
logic executed by the processor for automatically creating a new contact list on the online portal, the creation of the new contact list comprising electronically importing said determined portion of the second portal information into said new contact list, and electronically associating the new contact list with an account of the subscriber on the computerized online social network based on said determination that the subscriber is a member of the computerized social network; and
logic executed by the processor for establishing an electronic networked connection, over the online social network, with at least one other member of the computerized online social network that is identified in the new contact list, said established electronic networked connection enabling the subscriber to interact with said at least one other member via the online social network.

9. The social networking server of claim 8, wherein the computerized online social network includes at least one of a multiple degree relationship among members of the computerized online social network, and a shared interest among members of the computerized online social network.

10. The social networking server of claim 8, further comprising:
   tracking logic executed by the processor for tracking at least one of a frequency with which the subscriber accessed at least one of a portal service and a non-portal Web site, a duration over which the subscriber accessed at least one of the portal service and the non-portal Web site, a content type accessed by the subscriber through at least one of the portal service and the non-portal Web site, and an online purchase made by the subscriber through at least one of the portal service and the non-portal Web site.

11. The social networking server of claim 8, wherein the behavior of the subscriber comprises participating in at least one of an online friend matching service, an online dating service, an online job searching service, an online classmate searching service, an online military colleague searching service, an online club, an online financial service, an online auction, online purchase a buddy list, an instant messaging service, a mailing list, an online discussion group, a chat service, and an email service.

12. The server of claim 8, further comprising:
   revising logic executed by the processor for revising the new contact list to further include at least one of a contact within an address book of the subscriber, a contact within an address book of the other member within the portal, a contact associated with buddy list, a contact associated with an instant messaging list, a contact associated with an activity, a contact associated with a mailing list, a contact associated with an online discussion group, and a contact associated with a chat group.

13. A non-transitory computer-readable storage medium tangibly encoded with computer-executable instructions that when executed by a processor associated with a social networking server, enables the computing device to perform a method comprising:

receiving information related to a subscriber's intent to utilize a service associated with an online portal of a social network provided by the social networking server;

identifying a plurality of portal information associated with the online portal related to the subscriber, said plurality of portal information comprising a first portal information and second portal information, said first portal information comprising a portion of the plurality of portal information that is specific to the intended service of the online portal and is unmodifiable due to its relationship with the service, said second portal information comprising another portion that has features enabling its customization when establishing connections via the social network, said second portal information comprising electronic data indicating at least one behavior of the subscriber and portal assessment information, said at least one behavior indicating types of activities said subscriber has performed via said online portal and behavior information associated with each activity, said portal assessment information comprising data generated by other users of the online portal about said user;

determining that the subscriber is a member of a computerized online social network;

automatically determining a portion of said second portal information that comprises electronic data related to the subscriber and corresponding to at least one other member of the computerized online social network, said portion determination comprising analyzing the portion of the second portal information related to the at least one behavior and the portal assessment information, and, based on said analysis, identifying said behavior information for each behavior and the portal assessment information generated by said other users;

automatically creating a new contact list on the online portal, the creation of the new contact list comprising electronically importing said determined portion of the second portal information into said new contact list, and electronically associating the new contact list with an account of the subscriber on the computerized online social network based on said determination that the subscriber is a member of the computerized social network; and establishing an electronic networked connection, over the online social network, with at least one other member of the computerized online social network that is identified in the new contact list, said established networked connection enabling the subscriber to interact with said at least one other member via the online social network.

* * * * *